United States Patent
Ueda et al.

(10) Patent No.: US 7,097,345 B2
(45) Date of Patent: Aug. 29, 2006

(54) SCREW WITH HEAT EXCHANGE FUNCTION, MIXER AND EXTRUDER

(75) Inventors: Hiroshi Ueda, Takasago (JP); Kazuyoshi Imuta, Takasago (JP); Masahiko Kashiwa, Takasago (JP); Shoji Yasuda, Takasago (JP); Shin Hotani, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 178 days.

(21) Appl. No.: 10/816,807

(22) Filed: Apr. 5, 2004

(65) Prior Publication Data

US 2004/0234641 A1 Nov. 25, 2004

(30) Foreign Application Priority Data

May 19, 2003 (JP) .............................. 2003-140600

(51) Int. Cl.
  B29B 7/82 (2006.01)
  B29B 7/48 (2006.01)
(52) U.S. Cl. ........................... 366/147; 366/85; 165/87
(58) Field of Classification Search ............... 366/147, 366/79, 85, 97, 318, 321–324; 165/87, DIG. 148, 165/DIG. 149
  See application file for complete search history.

(56) References Cited

U.S. PATENT DOCUMENTS

| 158,246 | A | * | 12/1874 | Chesebrough | ............... 165/87 |
| 2,321,185 | A | * | 6/1943 | Christian | ..................... 165/87 |
| 2,688,770 | A | | 9/1954 | Henning | |
| 2,883,163 | A | * | 4/1959 | Peder | ............................ 165/87 |
| 4,355,905 | A | | 10/1982 | St. Louis et al. | |
| 5,273,356 | A | | 12/1993 | Piccolo, Sr. et al. | |
| 5,547,277 | A | * | 8/1996 | Caspelherr et al. | ......... 366/146 |

FOREIGN PATENT DOCUMENTS

JP 2778797 5/1998

OTHER PUBLICATIONS

Patent Abstracts of Japan, JP 56-144140, Nov. 10, 1981.
Patent Abstracts of Japan, JP 59-160522, Sep. 11, 1984.

* cited by examiner

*Primary Examiner*—David Sorkin
(74) *Attorney, Agent, or Firm*—Oblon, Spivak, McClelland, Maier & Neustadt, P.C.

(57) ABSTRACT

A screw with a heat exchange function is rotatably fit in a barrel, and includes a heat exchange medium chamber located at a center section in the radial direction, running along the lengthwise direction. The chamber stores a heat exchange medium supply pipe supplying a heat exchange medium. The heat exchange medium supply pipe is constituted by split pipes split into two or more sections in the lengthwise direction. Pipe connection joints connect the split pipes with each other while securing such degrees of freedom so that these split pipes can move by predetermined quantity in the lengthwise direction and the radial direction. The screw enables to stably supply a heat exchange medium for a long period without fatigue fracture of a heat exchange medium supply pipe even if the screw is bent during mixing and extrusion of a raw material.

5 Claims, 6 Drawing Sheets

SCREW WITH HEAT EXCHANGE FUNCTION, MIXER AND EXTRUDER

BACKGROUND OF THE INVENTION

1. Field of the Invention

The present invention relates to a screw, a mixer and an extruder which have a heat exchange function, and more particularly relates to a screw, a mixer and an extruder which have a heat exchange function enabling to supply a heat exchange medium without fatigue fracture of a heat exchange medium supply pipe even if the screw is bent and deformed during mixing and extrusion.

2. Description of the Related Art

In a mixer or an extruder which mixes or extrudes a raw material including thermoplastic resin such as resin and a rubber material, it is important for the quality of a product to adjust the temperature of the raw material being mixed or extruded, and to prevent the raw material from being over heated, attaching to a screw, and deteriorating. Hence, a medium communication hole (referred to as a heat exchange medium chamber hereinafter) is provided in the screw of the mixer and the extruder, and the screw is constituted such that the temperature is controlled by supplying a heat exchange medium such as liquid coolant into the heat exchange medium chamber.

In more detail, in the screw, there is formed the heat exchange medium chamber which is located at a center section in the radial direction, runs along the lengthwise direction, and has an opening on one shaft end. A heat exchange medium supply pipe is fit into the liquid coolant chamber through a rotary joint. In this case, the heat exchange medium supplied through the rotary joint flows through the heat exchange medium supply pipe, and flows out from an extreme end of the heat exchange medium supply pipe. The liquid coolant flowing out from the extreme end of the heat exchange medium supply pipe collides with a terminal end of the heat exchange medium chamber, and changes its direction toward a base end direction of the heat exchange medium supply pipe. The heat exchange medium then flows in a flow passage in a cylindrical shape formed between an outer periphery of the heat exchange medium supply pipe and an inner wall of the heat exchange medium chamber, and then flows out through the rotary joint.

There are two types of the heat exchange medium supply pipe which supplies the heat exchange medium into the heat exchange medium chamber of the screw of the mixer or the extruder. One type is constituted by one pipe, and the other type is constituted by connecting multiple pipes. Supports whose extreme end is in contact with the inner wall of the heat exchange medium chamber are provided at multiple locations in the lengthwise direction on the outer periphery of the heat exchange medium supply pipe of the former type. Namely, it is intended that the supports cause the center of the heat exchange medium supply pipe to coincide with the center in the radial direction of the heat exchange medium chamber. As for the heat exchange medium supply pipe of the latter type, multiple pipes are connected by threadedly attaching the pipes to pipe joints also serving as a support. The pipe joints also serving as the support cause the center of the heat exchange medium supply pipe to coincide with the center in the radial direction of the heat exchange medium chamber (for example, see Japanese Patent Publication No. 2778797).

Since the screw of the mixer or the extruder receives an offset load (bending force) from the raw material during the operation of the mixer or the extruder, the screw rotates while yielding. As a result, the highly rigid heat exchange medium supply pipe made of metal and the like is forcefully displaced repeatedly by the yield of the screw, and consequently, the heat exchange medium supply pipe may be fatigue-fractured. If the heat exchange medium supply pipe is fatigue-fractured, since cooling function (heat exchange function) provided for the screw decreases, it is impossible to adjust the temperature of the raw material being mixed or extruded, or to prevent the raw material which has melted, has being over heated, and has attached to the screw from deteriorating.

As a result, since it is necessary to stop the operation of the mixer or the extruder for maintenance, there has been such a problem to be solved that it is not possible to expect an increase of the productivity of a mixed material or extruded products due to the decrease of the availability of the mixer or the extruder in addition to a disadvantage in terms of the running cost of the mixer or the extruder.

SUMMARY OF THE INVENTION

Hence, it is an object of the present invention to provide a screw with a heat exchange function enabling to stably supply a heat exchange medium and to control the temperature for a long period without fatigue fracture of a heat exchange medium supply pipe even if the screw is bent during mixing and extrusion of a raw material, and to provide a mixer and an extruder comprising such a screw.

The present invention is devised in view of the foregoing conditions, and in order to solve the above problems, a screw with a heat exchange function according to the present invention comprises a heat exchange medium chamber located at a center section in the radial direction of the screw which runs along the lengthwise direction of the screw; and a heat exchange medium supply pipe supplying a heat exchange medium which is stored in the heat exchange medium chamber, wherein the heat exchange medium supply pipe comprises split pipes and is split into two or more sections in the lengthwise direction, and pipe connecting means bendably connects the split pipes with each other.

In the screw, it can be constructed such that a ring protrusion is provided on the end side of the split pipe, a groove into which the ring protrusion is fitted is provided on an inner surface of cylindrical section of the pipe connecting means, wherein the inner diameter of the cylindrical section of the pipe connecting means is set larger than the outer diameter of the split pipe, the diameter at the bottom of the groove is set larger than the outer diameter of the ring protrusion, and the width of the groove is set larger than the width of the ring protrusion, so that the split pipe can move in the lengthwise direction and the radial direction relative to the pipe connecting means by predetermined quantities.

In the screw, the pipe connecting means can also comprise a bendable bellows.

Also, a mixer according to the present invention comprises a barrel and the screw according to the present invention which is rotatably fit in the barrel, wherein material to be kneaded is supplied to the barrel and is kneaded by the screw.

Further, an extruder according to the present invention comprises a barrel and the screw according to the present invention which is rotatably fit in the barrel, wherein material to be mixed and extruded is supplied to the barrel and is mixed and extruded by the screw.

As described above, in the screw provided with the heat exchange function and the extruder according to the present invention, even if the screw rotates while it is bent by receiving an offset load (bending force) from a raw material, since the heat exchange medium supply pipe is constituted bendable using the pipe connecting means connecting the split pipes constituting the heat exchange medium supply pipe, and bends with the pipe connection means as start points, thereby absorbing the bend caused by the deformation of the screw, a bending stress is never generated on the split pipes constituting the heat exchange medium supply pipe. Therefore, there is no possibility of fatigue fracture of the heat exchange medium supply pipe for the screw according to the present invention.

Hence, according to the present invention, since it is possible to stably operate a mixer or an extruder for a long period, and the frequency of the maintenance decreases, there is provided a substantial effect of an increase of the productivity due to an increase of the availability in addition to an advantage in the running cost compared with the prior example.

DESCRIPTION OF THE PREFERRED EMBODIMENTS

Figure 1:
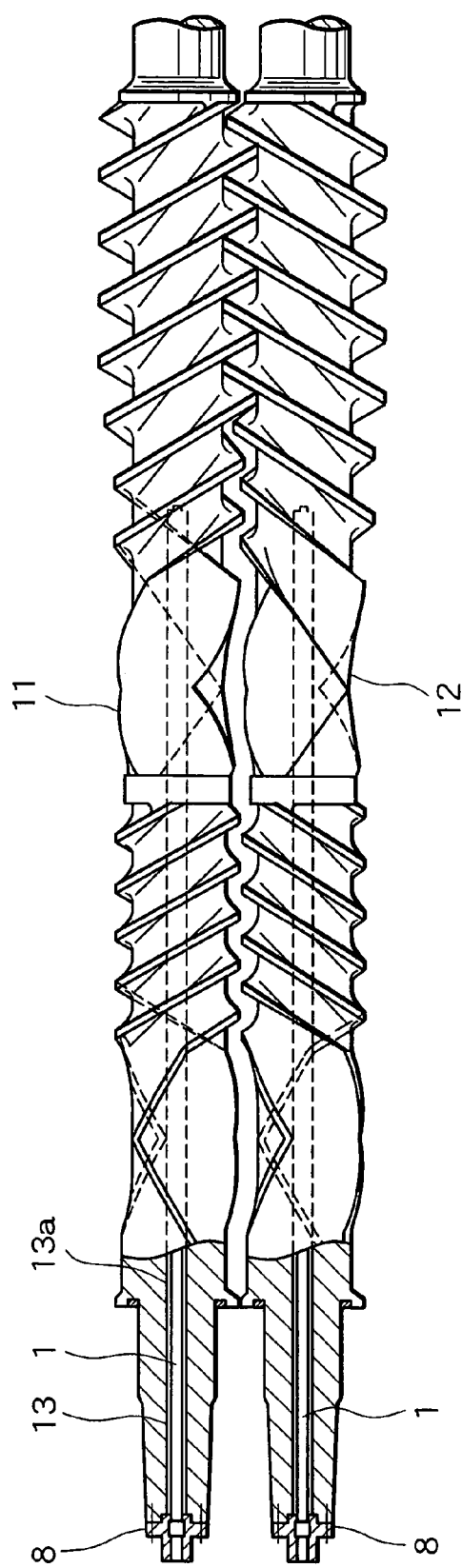
FIG. 1 is a constitution description view of screws with a partial cross sectional view according to a mode 1 for carrying out the present invention.
Figure 2:
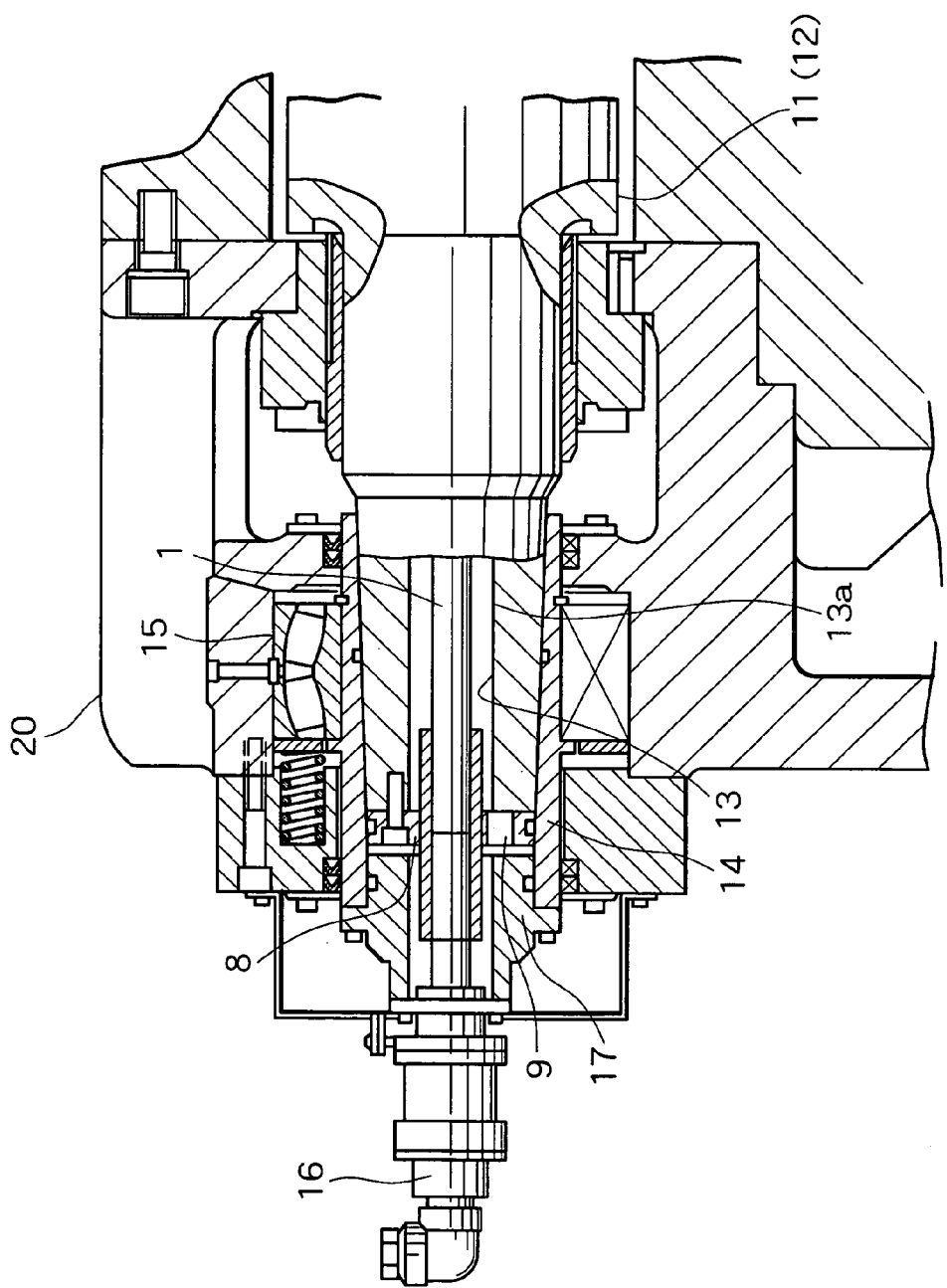
FIG. 2 is a cross sectional view of a vicinity of a base end (discharge opening side of a barrel) of the screw according to the mode 1 for carrying out the present invention.

A description will now be given of a screw with a heat exchange function according to a mode 1 for carrying out the present invention with reference to accompanying drawings while exemplifying a case where the screw is used for a two-shaft continuous mixer (referred to as a mixer hereinafter). FIG. 1 is constitution description view of screws with a partial cross sectional view, FIG. 2 is a cross sectional view of a vicinity of a base end (discharge opening side of a barrel) of the screw, FIG. 3 is a view of a whole heat exchange medium supply pipe with a partial cross sectional view, FIG. 4 is an enlarged view at a section A in FIG. 3 showing a connection constitution of split pipes, and FIG. 5 is a view made in a direction indicated by arrows B in FIG. 4.

In the barrel 20 of the mixer including a row material supply opening and the discharge opening spaced from each other on the both ends, the screws 11 and 12 meshing with each other in a raw material feed section facing the raw materially supply opening are rotatably fit. A sleeve 14 is fit on one end of these screws 11 and 12. The sleeve 14 is supported by a bearing 15 fit in a bearing housing provided in the barrel 20. The other unillustrated ends of these screws 11 and 12 are connected to a driving apparatus (not shown). A heat exchange medium chamber 13 is formed at a center section in the radial direction, and runs along the lengthwise direction both in these screws 11 and 12. A heat exchange medium supply pipe 1 having a constitution including multiple highly rigid pipes described later is stored in the heat exchange medium chamber 13. The heat exchange medium supply pipe 1 supplies a heat exchange medium such as liquid coolant, vapor, gas, and oil to the heat exchange medium chamber 13.

The base end of the heat exchange medium supply pipe 1 is connected to a pipe attaching member 8 provided with a return flow passage (through hole) 9 at a position displaced from the center in the radial direction. This attaching member 8 is fixed by fastening its flange section to a base end surface of the screws 11 and 12 with bolts. Further, a joint attaching member 17 is inserted into and fit to the sleeve 14. The flange of the joint attaching member 17 is fastened to an end surface of the sleeve 14 using bolts. The pipe attaching member 8 is supplied with the heat exchange medium from a rotary joint 16 fastened to the joint attaching member 17 using bolts. Namely, the heat exchange medium supply pipe 1 is supplied with the heat exchange medium such as liquid coolant, vapor, gas, and oil from unillustrated heat exchange medium supply source through the rotary joint 16 and the pipe attaching member 8.

Figure 3:
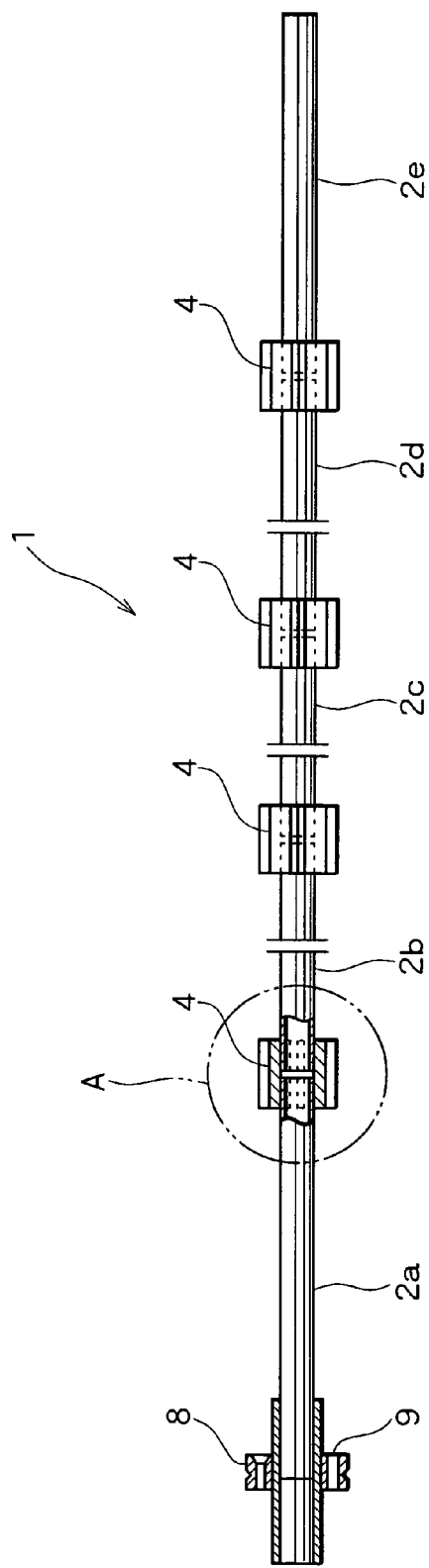
FIG. 3 is a view of a whole heat exchange medium supply pipe with a partial cross sectional view according to the mode 1 for carrying out the present invention.
Figure 4:
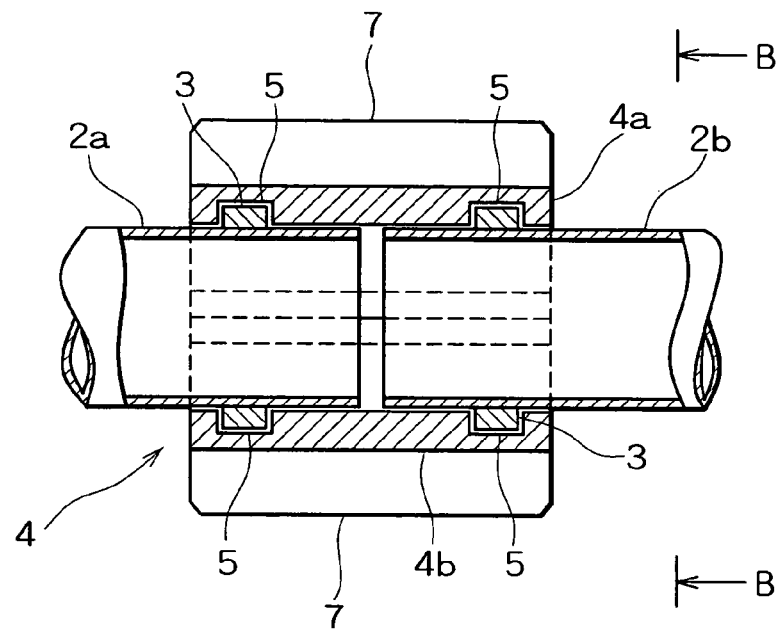
FIG. 4 is an enlarged view at a section A in FIG. 3 showing a connection constitution of split pipes according to the mode 1 for carrying out the present invention.
Figure 5:
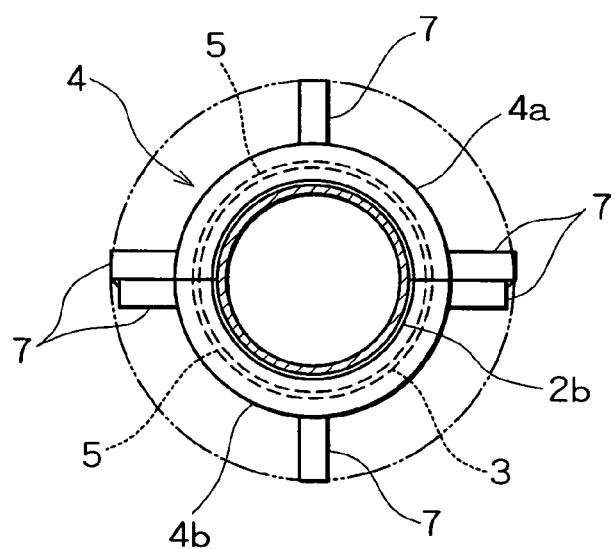
FIG. 5 is a view made in a direction indicated by arrows B in FIG. 4 according to the mode 1 for carrying out the present invention.

The heat exchange medium supply pipe 1 is constituted as shown in FIG. 3 through FIG. 5. Namely, this heat exchange medium supply pipe 1 is constituted by five split pipes 2a through 2e, and four pipe connecting joints 4 serving as pipe connecting means which connect these five split pipes 2a through 2e with each other. Ring protrusions 3 are fixed to the vicinities of a one end of the first split pipe 2a on the base end side connected to the pipe attaching member 8, and the fifth split pipe 2e on the extreme end side among the split pipes 2a through 2e. Ring protrusions 3 having a rectangular cross section are fixed to the vicinities of the both ends of three of the second split pipe 2b through the fourth split pipe 2d, which are between the first split pipe 2a and the fifth split pipe 2e.

The pipe connecting joint 4 includes a first half-split joint 4a and a second half-split joint 4b. The first and second half-split joints 4a, 4b include three supports 7 in a plate shape peripherally provided so as to be perpendicular to the outer peripheral surface of the first and second half-split joints 4a, 4b, and two lines of rectangular grooves in a semicircle shape on the inner peripheral surface of the first and second half-split joints 4a, 4b. Namely, the pipe connecting joint 4 having the two lines of the fitting grooves 5 and 5 on the inner peripheral surface, and the four supports 7 on the outer peripheral surface simultaneously is constituted by placing opening sides of the first half-split joint 4a and the second half-split joint 4b together, and simultaneously welding to join the supports 7 whose surfaces opposing to each other are placed together. Although the first half-split joint 4a and the second half-split joint 4b are joined by welding the supports 7 in the present mode 1, there may be a constitution where the supports 7 are joined using a bolt.

Two split pipes 2 are connected to each other using the pipe connecting joint 4 as described below. For example, first, the ring protrusions 3 provided at the end sections of the split pipes 2 are respectively fit into the two lines of the rectangular grooves of the first half-split joint 4a. Then, the rectangular grooves of the second half-split joint 4b are fit onto the ring protrusions 3 provided at the end sections of the split pipes 2, and end sections of the supports 7 whose surfaces opposing to each other are placed together are welded while the opening sides of the first and second half-split joints 4a and 4b are placed together.

In this case, the inner diameter of a cylindrical section of the pipe connecting joint 4 is set larger than the outer diameter of the split pipe 2 by 2 mm for example, the diameter at the bottom of the fitting groove 5 is set larger than the outer diameter of the ring protrusion 3 by 2 mm, and the width of the fitting groove 5 is set larger than the width of the ring protrusion 3 by 2 mm. Consequently, the split pipes 2 connected as described above can move in the lengthwise direction and the radial direction relative to the pipe connecting joint 4 by predetermined quantities. Namely, the split pipes 2 constituting the heat exchange medium supply pipe 1 according to the present mode 1 are connected so as to be bendable by a predetermined angle at the pipe connecting joint 4 section with the pipe connecting joint 4 as a start point.

In the present mode 1, the inner diameter of the cylindrical section of the pipe connecting joint 4 is set larger than the outer diameter of the split pipe 2 by 2 mm, and hence has a gap, as described above. Accordingly, the heat exchange medium leaks through this gap. However, these dimensions were determined after confirming that the temperature control function is not obstructed. Of course it is possible to seal the gap using a seal member having elasticity such as an O ring. In addition, although the four pipe connecting joints 4 are used in the present mode 1, the number of the pipe connecting joints 4 may be three or five, for example. The number of the pipe connecting joints is not limited. Namely, the number of the pipe connecting joints 4 can be determined in consideration of the maximum bend deformation quantity of the screw while the mixer is operating. Also, although a metal pipe is used for the split pipe 2 as the highly rigid pipe, a pipe made of other material may be used as long as the pipe does not present a bend and a yield.

When a type of pipe connecting means as shown in above mode 1 is applied, difference in size between the inner diameter of said cylindrical section of a pipe connecting joint and the outer diameter of a split pipe, between the diameter at the bottom of a fitting groove and the outer diameter of a ring protrusion, and between the width of the fitting groove and the width of the ring protrusion can be determined according to the number, the diameter and the length of the split pipe so as to be bendable by a predetermined angle, in consideration of the aforementioned leak of heat exchange medium.

A description will now be given of an operation form of the screws 11 and 12 according to the mode 1. During the operation of the mixer, the heat exchange medium supplied through the rotary joint 16 flows into the heat exchange medium supply pipe 1 through the pipe attaching member 8, then flows through it, and flows out the extreme end of the heat exchange medium supply pipe 1. The heat exchange medium flowing out from the extreme end of the heat exchange medium supply pipe 1 collides with a terminal end of the heat exchange medium chamber 13, and changes its direction toward the base end of the heat exchange medium supply pipe 1. Then, the heat exchange medium flows through a cylindrical flow passage 13a formed between the outer periphery of the heat exchange medium supply pipe 1 and the inner wall of the heat exchange medium chamber 13, flows through the return flow passage 9, and flows out from the system through the rotary joint 16. The heat exchange medium flowing in this way controls the temperature of the screws 11 and 12, and these screws 11 and 12 control the temperature of the raw material.

During the above-described operation of the mixer, these screws 11 and 12 rotate while they are bent by receiving an offset load (bending force) from the raw material as in the prior example. However, in the present mode 1, as described above, since the heat exchange medium supply pipe 1 can freely bend with the pipe connecting joints 4 as the start points, which connect the split pipes 2a through 2e constituting the heat exchange medium supply pipe 1 with each other, the heat exchange medium supply pipe 1 can absorb the bend due to the deformation of the screw. Hence, a bending stress is never generated on the split pipes 2a through 2e constituting the heat exchange medium supply pipe 1. Therefore, there is no possibility of fatigue fracture as in the heat exchange medium supply pipe for the screw according to the prior example.

As a result, according to the present mode 1, since it is possible to stably operate the mixer for a long period, and the frequency of the maintenance decreases, there is provided a substantial effect of an increase of the productivity due to the increase of the availability in addition to an advantage in the running cost compared with the prior example. Since the split pipes 2a through 2e are the highly rigid pipes, and hence do not practically bend or yield, it is possible to easily push the heat exchange medium supply pipe 1 into the heat exchange medium chamber 13 so that the extreme end of the heat exchange medium supply pipe 1 reaches a predetermined position.

Figure 6:
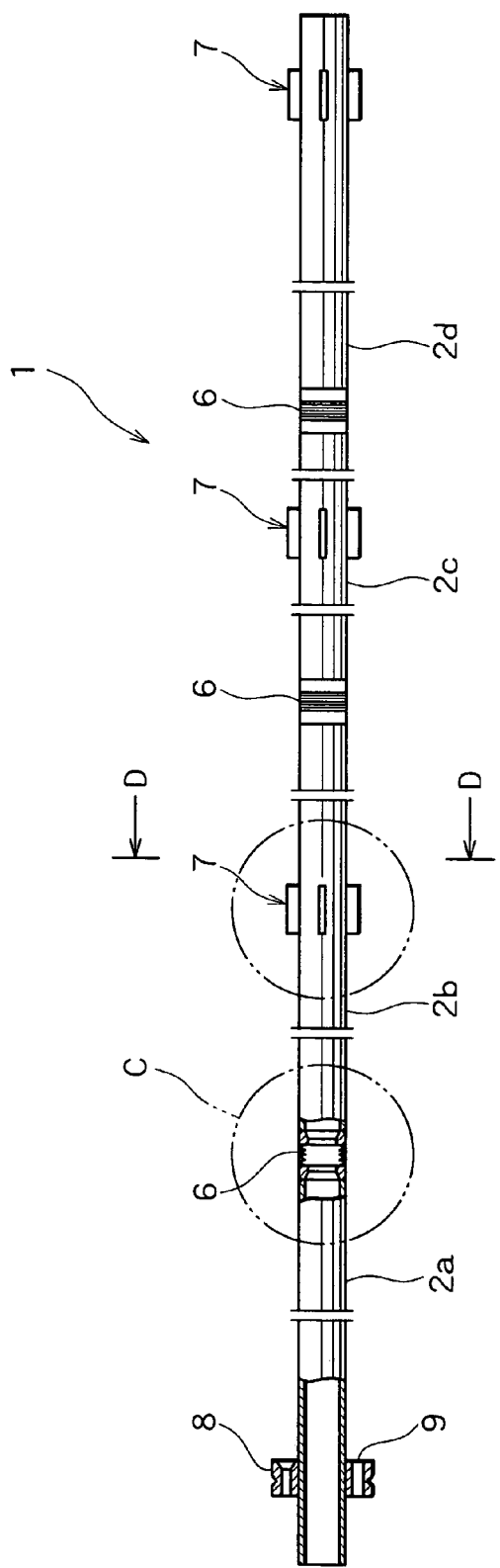
FIG. 6 is a view of a whole heat exchange medium supply pipe with a partial cross sectional view according to a mode 2 for carrying out the present invention.

A description will now be given of a screw with a heat exchange function according to a mode 2 for carrying out the present invention with reference to accompanying drawings exemplifying a case where the screw is used for a mixer. It should be noted that since the constitution of the screw itself is similar to that of the above-described mode 1, and only the constitution of the heat exchange medium supply pipe is different, a description would be given only of the heat exchange medium supply pipe. FIG. 6 is a view of the whole heat exchange medium supply pipe with a partial cross sectional view, FIG. 7 is an enlarged view at a section C in FIG. 6 showing a connection constitution of split pipes, and FIG. 8 is a cross sectional view made on a plane indicated by arrows D in FIG. 6.

Figure 7:
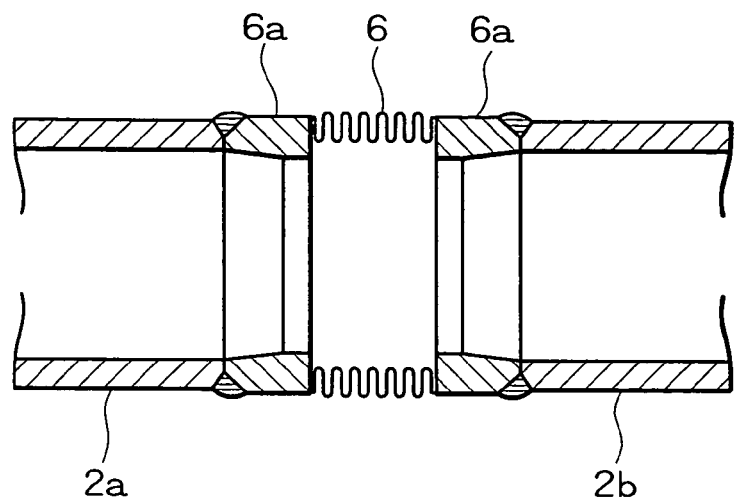
FIG. 7 is an enlarged view at a section C in FIG. 6 showing a connection constitution of split pipes according to the mode 2 for carrying out the present invention.
Figure 8:
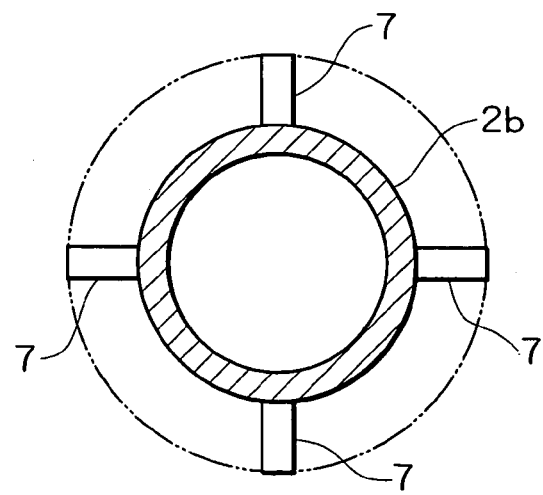
FIG. 8 is a cross sectional view made on a plane indicated by arrows D in FIG. 6 according to the mode 2 of the present invention.

Namely, the heat exchange medium supply pipe 1 according to the present mode 2 is constituted by the four split pipes 2a through 2d and three bendable bellows 6 in an accordion-fold form which serve as pipe connecting means for connecting these four split pipes 2a through 2d with each other, as shown in FIG. 6 through FIG. 8. Four supports 7 in a plate shape are peripherally provided at 90° on an outer periphery of the second split pipe 2b through fourth split pipe 2d, except for the first split pipe 2a on the base end side connected to a pipe attaching member 8, among the split pipes 2a through 2d.

In the present mode 2, as shown in FIG. 7, a ring bodies 6a are fixed to both ends of the bellows 6, and the ring body 6a and an end section of the split pipe 2 are connected by welding. The bellows 6 is connected to the split pipe 2 through the ring body 6a in this way, since the bellows 6 is thin, and it is difficult to connect the bellows 6 itself using other methods. Though the bellows 6 is used in the present mode 2, the bellows 6 may be replaced with a flexible hose (connected to the split pipe using a hose cramp), for example.

In the present mode 2, since the heat exchange medium supply pipe 1 is constituted so as to be bendable with the bellows 6 as the start points as described above, a bending stress is never generated on the first through fourth split pipes 2a through 2d constituting the heat exchange medium supply pipe 1. Hence, it is possible to stably operate the mixer for a long period, which is an effect similar to that of the above-described mode 1.

The above description is given of cases where the screws 11 and 12 provided with the heat exchange medium supply pipe 1 according to the present modes are supported in a straddle mount manner in the continuous mixers. However, since technical idea of the present invention can be applied to a continuous mixer having a screw supported in a overhang mount manner, or a screw of an extruder, the technical idea is not limited to the application to the screw supported in the straddle mount manner used for the mixer.

What is claimed is:

1. A screw with a heat exchange function comprising:
   a screw element having an end portion which is rotatably supported by a bearing;
   a heat exchange medium chamber located at a center section in the radial direction of said screw element, said heat exchange medium chamber running along the lengthwise direction of said screw element;
   a heat exchange medium supply pipe supplying a heat exchange medium, said heat exchange medium supply pipe having a first portion provided entirely at one side of said bearing in the lengthwise direction of said screw element and extending in said heat exchange medium chamber, said heat exchange medium supply pipe further including a second portion provided entirely at another side of said bearing in the lengthwise direction of said screw element and extending out of said screw element, said another side being opposite said one side in the lengthwise direction of said screw element, wherein said first portion of said heat exchange medium supply pipe comprises split pipes and is split into two or more sections in the lengthwise direction of said screw element, and
   pipe connecting means for bendably connecting said split pipes with each other.

2. The screw according to claim 1, wherein said pipe connecting means comprises a bendable bellows.

3. A mixer comprising:
   a barrel; and
   the screw according to claim 1, said screw being rotatably fit in said barrel, wherein material to be kneaded is supplied to said barrel and is kneaded by said screw.

4. An extruder comprising:
   a barrel; and
   the screw according to claim 1, said screw being rotatably fit in said barrel, wherein material to be mixed and extruded is supplied to said barrel and is mixed and extruded by said screw.

5. A screw with a heat exchange function comprising:
   a heat exchange medium chamber located at a center section in the radial direction of said screw, said heat exchange medium chamber running along the lengthwise direction of said screw; and
   a heat exchange medium supply pipe supplying a heat exchange medium, said heat exchange medium supply pipe being stored in said heat exchange medium chamber,
   wherein said heat exchange medium supply pipe comprises split pipes and is split into two or more sections in the lengthwise direction, and pipe connecting means bendably connects said split pipes with each other, wherein a ring protrusion is provided on the end side of said split pipe, a groove into which said ring protrusion is fitted is provided on an inner surface of cylindrical section of said pipe connecting means,
   and wherein the inner diameter of said cylindrical section of said pipe connecting means is set larger than the outer diameter of said split pipe, the diameter at the bottom of said groove is set larger than the outer diameter of said ring protrusion, and the width of said groove is set larger than the width of said ring protrusion, so that said split pipe can move in the lengthwise direction and the radial direction relative to the pipe connecting means by predetermined quantities.

* * * * *